US012721363B2

(12) United States Patent
Kumar et al.

(10) Patent No.: US 12,721,363 B2

(45) Date of Patent: Sep. 1, 2026

(54) PEA PROTEIN ISOLATE COMPOSITION AND PROCESS FOR PRODUCTION THEREOF

(71) Applicant: Louis Dreyfus Company Plant Proteins LLC, Livermore, CA (US)

(72) Inventors: Manoj Kumar, Livermore, CA (US); Prasanth Kumar Sasidharan Pillai, Livermore, CA (US)

(73) Assignee: Louis Dreyfus Company Plant Proteins LLC, Livermore, CA (US)

( * ) Notice: Subject to any disclaimer, the term of this patent is extended or adjusted under 35 U.S.C. 154(b) by 0 days.

(21) Appl. No.: 18/772,038

(22) Filed: Jul. 12, 2024

(65) Prior Publication Data

US 2026/0013531 A1 Jan. 15, 2026

(51) Int. Cl.
*A23J 3/14* (2006.01)
*A23J 1/00* (2006.01)

(52) U.S. Cl.
CPC *A23J 3/14* (2013.01); *A23J 1/006* (2013.01)

(58) Field of Classification Search
CPC ................. A23J 3/16; A23J 1/006; A23J 3/14
See application file for complete search history.

(56) References Cited

U.S. PATENT DOCUMENTS 4,279,939 A * 7/1981 Cho ......................... A21D 2/26 426/583
11,304,435 B2 4/2022 Foster et al.
2008/0171356 A1* 7/2008 Nakamura .............. A23J 3/346 435/68.1
2022/0022490 A1 1/2022 Calmon et al.
2022/0030908 A1* 2/2022 Zhou ....................... A23L 11/31
2022/0039431 A1 2/2022 McFarlane et al.
2022/0046950 A1 2/2022 Buche et al.
2022/0053793 A1* 2/2022 Schmitt ................... A23L 23/00
2022/0117259 A1 4/2022 Takayanagi et al.
2022/0408754 A1* 12/2022 Grabinski ............. A23L 29/256
2022/0408760 A1* 12/2022 Sato .......................... A23L 2/52
2023/0292788 A1* 9/2023 Schwab .................. A23J 1/006 426/656

FOREIGN PATENT DOCUMENTS

CA 2878482 1/2014
CA 3010624 7/2017
CN 113768031 A * 12/2021 ............. A23J 1/148
WO WO 2021/260169 12/2021
WO WO 2022/112292 6/2022
WO WO 2022/117917 6/2022
WO WO 2022/136627 6/2022
WO WO 2023/137569 7/2023

OTHER PUBLICATIONS

CN113768031A (Clarivate machine translation) (Year: 2021).*
Cui, et al.; "Identification of extraction pH and cultivar associated aromatic compound changes in spray dried pea protein isolate using untargeted and targeted metabolomic approaches"; Journal of Agriculture and Food Research; vol. 2, No. 100032, pp. 1-10 (Dec. 2020).
Cui, et al.; "Functionality and structure of yellow pea protein isolate as affected by cultivars and extraction pH"; Food Hydrocolloids; vol. 108, No. 106008, pp. 1-13 (Nov. 2020).
Emkani, et al.; "Pea Protein Extraction Assisted by Lactic Fermentation: Impact on Protein Profile and Thermal Properties"; Foods; vol. 10, No. 3, Article 549, pp. 1-15 (2021).
Gao, et al.; "Effect of alkaline extraction pH on structure properties, solubility, and beany flavor of yellow pea protein isolate"; Food Research International; vol. 131, No. 109045, pp. 1-9 (May 2020).

* cited by examiner

*Primary Examiner* — Andrew E Merriam
(74) *Attorney, Agent, or Firm* — Edward J. Baba; Andrew R. Guzman; Bozicevic, Field & Francis LLP

(57) ABSTRACT

The present disclosure provides processes for producing reduced sodium pea protein isolate (PPI), reduced sodium PPI produced by the processes and use of reduced sodium PPI. The processes for producing reduced sodium PPI comprise precipitating protein from a pea protein solution to produce a PPI and neutralizing the PPI with NaOH and $Mg(OH)_2$, thereby producing a reduced sodium PPI.

16 Claims, No Drawings

PEA PROTEIN ISOLATE COMPOSITION AND PROCESS FOR PRODUCTION THEREOF

BACKGROUND OF THE INVENTION

Pea protein research and development has grown recently due to the unique functionality of pea protein compared to soy, wheat, and other plant proteins. Peas are rich in storage proteins, including salt solution-soluble globulins and water-soluble albumins (Lam et al. (2018) Food Reviews International, 34(2), 126-1470). In the conventional isoelectric precipitation procedure for producing pea protein isolate, a relatively quick pH manipulation using NaOH to neutralize the protein isolate before drying results in a pea protein isolate with a notably high sodium content. Therefore, there is a great need for a new extraction/precipitation method to develop a PPI that is lower in sodium while maintaining a good flavor and texture profile and functionality (e.g., good gelling and emulsifying capabilities, foaming capacity and foaming stability).

SUMMARY OF THE INVENTION

The present disclosure provides processes for producing reduced sodium content in pea protein isolate. In some embodiments, the process is a pea protein isolate (PPI) extraction process. More specifically, the pea protein isolate (PPI) extraction process comprises neutralizing PPI using a combination of Na salt and Mg salt, resulting in PPI with reduced sodium content as compared to PPI (Conventional PPI) produced using only NaOH.(conventional method).

In one aspect of the invention, reduced sodium PPI is produced by precipitating protein from an acidic pea protein solution to produce a PPI and diluting the PPI with water and adjusting the pH to about neutral by adding NaOH and $Mg(OH)_2$.

In some aspects, the PPI extraction process comprises extracting protein from a pea plant source in a alkaline solution to create a protein solution, separating the protein solution from the remaining pea plant solids precipitating protein from the protein solution by lowering pH to produce a pea protein isolate, diluting the PPI with water and neutralizing the PPI by adding NaOH and Mg(OH)2 to raise the pH of the PPI to about neutral.

In certain aspects of the invention, neutralizing the PPI comprises adding NaOH to raise the pH, then adding Mg(OH)2 to raise the pH of the PPI to about neutral. In some embodiments, neutralizing comprises adding NaOH to raise the pH to about 6.0-6.9, then adding Mg(OH)2 to raise the pH to about 7.0 to 7.5.

In some aspects of the PPI extraction process, extracting is performed at a pH of about 7.5 to about 10. In some embodiments, extracting is performed at a pH of about 9.5.

In certain embodiments of the PPI extraction process, extracting is performed at a temperature of about 30° C. to about 80° C. In some embodiments of the PPI extraction process, extracting is performed at a temperature of about 55° C.

In some aspects of the PPI extraction process, extracting is performed for about 10 to about 60 minutes. In some embodiments, the extracting is performed for about 30 minutes.

In certain aspects of the PPI extraction process, the extracting is performed in a solution of about 5% to about 25% pea plant solids. In some embodiments the extracting is performed at about 10% pea plant solids.

In certain aspects of the PPI extraction process, the separating is performed by centrifugation. In some embodiments, the centrifugation is performed at about 2000 g to about 10000 g. In certain embodiments the centrifugation is performed at about 5000 g. In some embodiments, the centrifugation is performed for about 2 to about 25 minutes. In certain embodiments the centrifugation is performed for about 10 minutes.

In certain embodiments of the invention, precipitating is performed at about pH 3 to about pH 6.5. In some embodiments, precipitating is performed at about pH 4.5.

In certain embodiments of the invention, precipitating is performed for about 10 to about 60 minutes. In some embodiments the precipitating is performed for about 30 minutes.

In certain embodiments of the invention, precipitating is performed at a temperature of about 30° C. to about 80° C. In some embodiments, precipitating is performed at a temperature of about 55° C.

Certain embodiments of the invention comprise washing the PPI between the precipitating step and the diluting and neutralizing step. In some embodiments, the washing is performed at acidic pH. In certain embodiments the washing is performed at precipitation pH. In certain embodiments the washing is performed 1 to 4 times.

In certain embodiments, diluting and neutralizing is performed by adding water 1 to 4 times the volume of PPI to make a slurry. In some embodiments, 2 times the volume of PPI is added. In certain embodiments, the diluting and neutralizing comprises adding NaOH and $Mg(OH)_2$ to raise the pH of the slurry to about neutral. In some embodiments, NaOH is added to raise the pH of the PPI to a predetermined pH, then adding Mg(OH)2 to raise the pH of the PPI to a higher predetermined pH. In certain embodiments, NaOH is added to raise the pH to pH 6.0-pH 6.9, then adding Mg(OH)2 to raise the pH to pH 7.0-7.5. In some embodiments, NaOH is added to a concentration of about 0.5% to about 0.9% and Mg(OH)2 is added to a concentration of about 0.05% to about 0.3%. In some embodiments, the final pH of the PPI in the diluting and neutralizing step is about neutral. In certain embodiments the final pH of the PPI in the diluting and neutralizing step is about 7.0.

In Some embodiments, the PPI is homogenized. In certain embodiments, the PPI is sterilized or pasteurized.

In some embodiments the reduced sodium PPI is dried. In certain embodiments, drying is performed by freeze drying and/or spray drying.

The present disclosure provides a reduced sodium PPI. In certain embodiments the reduced sodium PPI is produced by the procedures of the present disclosure. In some embodiments, the PPI of the present invention comprises about 0.4% to about 0.9% Na and about 0.05% to about 0.35% Mg.

In still other aspects, the present disclosure provides use of the reduced sodium PPI of the present disclosure in a food or beverage application. In some embodiments, the food or beverage application is selected from milk shake, protein bars, meat analogues, confectionary, condiments, mayonnaise, salad dressing, nutritional supplements and diary alternatives. In certain embodiments, the dairy alternative is selected from creamers, ice cream, yogurt, buttermilk and cheese.

In yet other aspects, the present disclosure provides a food or beverage comprising the reduced sodium PPI of the present disclosure.

DETAILED DESCRIPTION OF THE INVENTION

The present disclosure provides processes for producing reduced sodium pea protein isolate (PPI). More specifically, the pea protein isolate (PPI) extraction processes comprise precipitating at acidic pH a pea protein isolate from a protein solution and neutralizing the PPI with NaOH and $Mg(OH)_2$ to produce a reduced sodium PPI. Also provided are reduced sodium pea protein isolates and uses thereof.

Before the present processes, compositions and uses are described, it is to be understood that this invention is not limited to the particular methods or compositions described, which may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

The term "about", particularly in reference to a given quantity, is meant to encompass deviations of plus or minus five percent.

"Extracting" or "extraction" means the removal or separation of one or more component(s) of a multicomponent composition. The concept of extracting a protein isolate from a seed protein flour is well known in the present art.

"Neutral", as it applies to pH, means a pH of about 6.5 to 7.5. In most applications, Neutral means about pH 7.0.

"Neutralizing" or "neutralization" means the addition of salts to bring the pH to about neutral. Typically an acidic product or solution is neutralized by adding a $OH^-$-containing salt, the most common of which is NaOH.

The term "pea protein isolate (PPI)" used herein refers to the final product of pea protein extraction from the pulse of legumes of the genus *Pisum*. It's a highly concentrated protein substance. Pea protein isolate is the extracted protein created through a chemical process that separates protein from other elements of peas.

"Substantially in native form" in the context of proteins extracted from plants means that the proteins have not been denatured due to, for example, exposure to excessive heat, so that the 3-dimensional structure of the proteins are generally maintained in the form found in the pre-processed seed.

"Conventional PPI" Used Herein Refers to PPI which is Neutralized after Protein Precipitation Using Only NaOH.Reduced Sodium Pea Protein Isolate (PPI) Processes The present disclosure provides reduced sodium pea protein isolate (PPI) processes. More specifically, the reduced sodium PPI is prepared by the acidic precipitation of protein from a protein solution and neutralization of the resultant PPI using NaOH and $MG(OH)_2$. In some embodiments, the pea protein is extracted in a basic aqueous solution from pea plant products, typically pea pulse flour, to produce a protein solution. Reduced sodium PPI is produced by precipitating protein from a pea protein solution from which pea plant solids have been separated. The PPI is then neutralized by adding NaOH and $Mg(OH)_2$. The processes are described in detail in the following paragraphs.

In some aspects, processes of the invention comprise steps of a) extracting protein from pea plant product, typically pea pulse flour, in a basic solution to produce a protein solution b) separating pea plant solids from the aqueous solution c) precipitating protein from the protein solution at acidic pH to produce a PPI and d) diluting and neutralizing the PPI by adding water and NaOH and $Mg(OH)_2$ to produce reduced sodium PPI.

In some aspects of the invention, a process comprises the steps of a) precipitating protein from a pea protein solution at acidic pH to produce a pea protein isolate and b) neutralizing the PPI by adding NaOH and $Mg(OH)_2$, thereby providing a reduced sodium PPI.

Starting Materials

In some embodiments, starting materials for extracting pea protein to make a protein solution may be pea flour and the like. In order to prepare the starting materials, raw pea seeds (pulses) undergo pre-treatment steps such as cleaning, drying, sorting, dehulling, and splitting that allow the detachment of the hulls and the cotyledons from whole pulses. This pre-treatment of pea seeds is well-known technique in the art.

a) Protein Extraction

In some aspects, the PPI extraction process comprises a) extracting protein from pea flour in an aqueous solution to produce a protein solution. Processes for extracting protein from pea flour to produce a protein solution are well known in the art and may involve isoelectric protein extraction or salt extraction.

In some embodiments, the aqueous solution comprising pea flour is a mixture of water and pea flour which was prepared by pretreatment step. In some cases, the ratio of flour and water is 1:4, 1:5, 1:6, 1:7, 1:8, 1:9, 1:10, 1:11, 1:12, 1:13, 1:14, 1:15, 1:16, 1:17, 1:18, 1:19, 1:20, 1:21, 1:25, 1:30. In certain cases the concentration of pea flour in the aqueous solution is 2% to 40% solids. In some embodiments the concentration of pea flour in the aqueous solution is 10%. In certain embodiments the concentration of pea flour in the aqueous solution is 1%, 2%, 3% 4%, 5%, 6%, 7%, 8%, or 9%. In some embodiments the concentration of pea flour in the aqueous solution is 11%, 12%, 13%, 14%, 15%, 16%, 17%, 18%, 19%, 20%, 20%, 22%, 23%, 24%, 25%, 26%, 27%, 28%, 29%, 30%, 31%, 32%, 33%, 34%, 35%, 36%, 37%, 38%, 39% or 40%.

In some embodiments, the protein extracting is performed by regulating pH. In some embodiments, the protein extracting is performed at a pH of about 7.5 to 10. In certain embodiments, pH of the protein extracting is in the range of pH 7 to 9.5, pH 7 to 9, pH 7 to 8.5, pH 7 to 8, pH 7 to 7.5, pH 7.5 to 10, pH 7.5 to 9.5, pH 7.5 to 9, pH 8 to pH 9.5, or pH 8.5 to 9.5. In certain cases, pH of the extracting is at 9.5. In some embodiments, the protein extracting includes salts to enhance extraction of the protein. See, e.g., U.S. patent application Ser. No. 18/771,902.

In some embodiments, the protein extracting is performed at a temperature of 15° C. to about 85° C. In certain embodiments, the temperature for the salt extraction of step a) is in the range of about 20 to about 95° C., about 25 to about 95° C., about 30 to about 95° C., about 35 to about 95° C., about 40 to about 95° C., about 45 to about 95° C., about 50 to about 95° C., about 55 to about 95° C., about 60 to about 95° C., about 65 to about 95° C., about 70 to about 95° C., about 50 to about 90° C., about 50 to about 85° C., about 50 to about 80° C., about 50 to about 75° C., about 50 to about 70° C., about 60 to about 95° C., about 60 to about 90° C., about 60 to about 85° C., about 60 to about 80° C., about 60 to about 75° C., about 18 to about 60° C., about 18 to about 50° C., about 18 to about 40° C., or about 18 to about 35° C. In certain cases, the temperature for the salt extraction of step a) is in the range of about 55° C. to about 95° C. In certain cases, the temperature for extracting is in the range of about 18 to about 60° C. In certain embodiments extracting protein is performed at 55° C.

In some embodiments, the time for protein extraction of step a) is in the range of about 10 to 60 minutes for extraction. In certain embodiments, the time for salt extraction of step a) is about 15 minutes, about 20 minutes, about 30 minutes, 35 minutes, about 40 minutes, about 45 minutes, about 50 minutes, about 55 minutes, or about 60 minutes. In certain embodiments the protein extracting is performed for about 30 minutes.

In some embodiments, the protein extraction step a) is optionally done by utilizing one or more types of salt. In some embodiments, the salt is Na, Ca, or Mg salt or combination thereof. In certain embodiments, the salt is selected from NaCl, $CaCl_2$, $MgCl_2$, Sodium hexameta phosphate (SHMP), sodium triphosphate (STP), $CaPOCl_3$, calcium perchlorate, sodium sulfite, sodium bisulfite, sodium thiocyanate and calcium thiocyanate. In certain embodiments, the salt is SHMP, STP, $CaPOCl_3$ or calcium perchlorate, or combination thereof. In certain embodiments, the salt is SHMP. In certain embodiments, the salt is STP. In certain embodiments, the salt is $CaPOCl_3$.

In some embodiments, the protein extraction step a) optionally includes about 0.5 to about 5% concentration of the salt. In certain embodiments, the concentration of the salt is in the range of about 0.5 to about 5%, about 0.5 to about 4.5%, about 0.5 to about 4.0%, about 0.5 to about 3.5%, about 0.5 to about 3%, about 0.5 to about 2.5%, about 0.5 to about 2%, about 1 to about 5%, about 1.5 to about 5%, about 2 to about 5%, about 2.5 to about 5%, about 2.5 to about 5%, about 2.5 to about 5%, about 2.5 to about 5%, about 2.5 to about 4.5%, about 2.5 to about 4%, about 2.5 to about 3.5%, or about 2.5 to about 3%. In certain embodiments, the concentration of the salt is 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5%.

b) Separation of Solids from the Aqueous Solution

In some aspects, the pea protein isolate (PPI) extraction process further comprises b) separating solids from the protein solution. Methods for separating a plant protein source, such as pea flour, from a protein solution are well known in the art. In certain embodiments, the liquid fraction from step b) is supernatant. For example, the liquid fraction includes protein, mineral, vitamin, and the like.

A common method of separation is centrifugation. In some embodiments, the separating is performed by centrifugation. In some embodiments the centrifugation is performed at 2000 g to 15000 g. In certain embodiments, the centrifugation is performed at 5000 g. In certain embodiments centrifugation is performed for 2 to 25 minutes. In some embodiments centrifugation is performed for about 10 minutes. In some embodiments centrifugation is performed at room temperature. In certain embodiments, the centrifugation is performed at about 4° C. to 30° C.

In other embodiments, the separating is performed by decanting. Any method or combination of methods of separation may be employed, and the determination of a proper method of separating a liquid fraction from the solids is well within the skill of the ordinary artisan.

c) Precipitating Protein from Protein Solution

In some aspects, the processes of the invention comprise precipitating protein from a pea protein solution to produce a pea protein isolate. In some embodiments, precipitating protein is performed at a pH about 3 to about 6.5. In certain embodiments, precipitating protein is performed in the range of pH 4 to 7.0, pH 3 to 7, pH 4.5 to 6.5, pH 4.5 to 7.0, or pH 4 to 7. In some embodiments the precipitating protein is performed at pH 4.5.

In some embodiments, precipitating protein is performed for 10 minutes to 60 minutes. In certain embodiments, precipitation of protein is performed for about 15 minutes, about 20 minutes, about 30 minutes, about 35 minutes, about 40 minutes, about 45 minutes, about 50 minutes, about 55 minutes, or about 60 minutes. In some embodiments, precipitating protein is performed for 30 minutes.

In some embodiments, precipitating protein is performed at a temperature in the range of about 18 to about 80° C., about 20 to about 60° C., about 20 to about 55° C., about 25 to about 50° C., about 30 to about 65° C., about 25 to about 60° C., about 20 to about 55° C., about 20 to about 50° C., about 30 to about 55° C., about 25 to about 60° C., about 25 to about 60° C., about 25 to about 55° C., about 40 to about 60° C., about 30 to about 55° C. In some embodiments precipitating protein is performed at 55° C.

d) Washing the PPI

In some aspects, the process of the invention further comprise washing the PPI after precipitating protein. In some embodiments, the washing is performed with water at the precipitation pH. In other embodiments, the protein isolate from step d) is washed two times at precipitation pH such as pH in the range of about 3 to about 6.5, pH 4 to 7., pH 4 to 6.5, pH 4.5 to 6, pH 5 to 6, or pH 4 to 6. In a certain embodiments, washing is performed at pH 4.5. Washing of PPI is a well-known technique in the art.

e) Diluting PPI to Make a Protein Slurry

In some embodiments, the processes of the invention further comprise diluting the PPI to make a protein slurry. In certain embodiments the diluting comprises adding water to the PPI. In some embodiments, diluting comprises adding water 1× to 4× the volume of the PPI. In certain embodiments, diluting comprises adding water at 2× the volume of the PPI. Creating a protein slurry is well-known technique in the art.

f) Neutralizing the Pea Protein Isolate

In some aspects of the invention, the processes comprise neutralizing the PPI. In certain embodiments, neutralizing comprises adding NaOH and $Mg(OH)_2$ to the PPI to raise the pH to about neutral. In some embodiments, neutralizing comprises adding NaOH to raise the pH to pH 6.0 to 6.9, then adding $Mg(OH)_2$ to raise the pH to about pH 7 to about pH 7.5. In certain aspects, the neutralizing comprises adding NaOH to raise the pH to about 6.0, then adding $Mg(OH)_2$ to raise the pH to about pH 7. In certain aspects, the neutralizing comprises adding NaOH to raise the pH to about 6.2, then adding $Mg(OH)_2$ to raise the pH to about pH 7. In certain aspects, the neutralizing comprises adding NaOH to raise the pH to about 6.5, then adding $Mg(OH)_2$ to raise the pH to about pH 7. In certain aspects, the neutralizing comprises adding NaOH to raise the pH to about 6.7, then adding $Mg(OH)_2$ to raise the pH to about pH 7. In certain aspects, the neutralizing comprises adding NaOH to raise the pH to about 6.9, then adding $Mg(OH)_2$ to raise the pH to about pH 7.

g) Homogenization and Sterilization of PPI

In some aspects, the processes of the invention further comprise homogenization and sterilization of PPI. In some embodiments, the PPI is homogenized by means known in the art. For example, a high-pressure homogenizer may be used. The homogenized PPI is then sterilized and/or pasteurized.

Means for sterilizing protein for use in foods are known in the art. In some embodiments, the sterilization temperature is in the range of 75 to 140° C., 80 to 140° C., 90 to 140° C., 100 to 140° C., 75 to 130° C., 75 to 120° C., 75 to 110° C., or 75 to 100° C. An example of such a means is direct steam injection. The protein slurry may be subjected to direct steam injection for between 2 seconds and 10 minutes, such as 2 seconds, 5 seconds, 10 seconds, 15 seconds, 20 seconds, 25 seconds, 30 seconds, 35 seconds, 40 seconds, 45 seconds, 50 seconds, 55 seconds, 1 minutes, 2 minutes, 3 minutes, 4 minutes, 5 minutes, 6 minutes, 7 minutes, 8 minutes, 9 minutes, 10 minutes.

h) Drying Protein Slurry

In some aspects, the processes of the invention further comprise drying the PPI. The PPI is dried using a drying apparatus known in the art. In some embodiments, heat during drying does not rise above about 60° C. Several such apparatuses, such as spray dryers, freeze dryer, ring dryers, dispersion dryers, drum dryers and fluid bed dryers, are commercially available. The resulting pea protein isolate may then be used as further described below.

Pea Protein Isolates (PPI)

In addition to the processes for producing reduced sodium PPI, the present disclosure provides reduced sodium PPIs produced by such processes and reduced sodium PPI having particular useful characteristics. The processes are described in the section "Reduced Sodium Pea Protein Isolate (PPI) Processes" above. The pea protein isolates are also referred to herein as PPI.

In some embodiments, the pea protein isolate produced by the above processes is reduced sodium protein isolate. In some embodiments, the reduced sodium PPI produced by the above process has a protein content in the range of about 80 to about 90 wt % (Nx6.25) on a dry basis. In other embodiments, the reduced sodium PPI has protein content in the range of about 80% to about 95% on a dry basis. In yet other embodiments, the reduced sodium PPI has protein content in the range of about 80% to about 92% on a dry basis. The process allows for the protein of the reduced sodium PPI to substantially maintain its native form.

For the purposes of the present disclosure, percent sodium and magnesium content are measured as wt % on a dry basis. In Some embodiments, the PPI of the present invention has sodium content of 0.5% to 0.9%. In some embodiments, the PPI of the present invention has sodium content of <0.6%. The PPI of the present invention has sodium content of <0.55%, <0.56%, <0.57%, <0.58%, <0.59%, <0.60%, <0.61%, <0.62%, <0.63, <0.64%, <0.65%, <0.66%, <0.67%, <0, <0.68%, <0.69%, <0.70%, <0.71%, <0.72%, <0.73%, <0.74%, <0.75%, <0.76%, <0.77%, <0.78%, <0.79%, <0.80%, <0.81%, >0.82%, <0.83%, <0.84%, <0.85%, <0.86%, <0.87%, <0.88%, <0.89% or <0.90%.

In some embodiments, sodium content of the PPI of the invention is reduced by up to 45% over Conventional PPI. In certain embodiments, the PPI of the present invention has 44% less sodium, 43% less sodium, 42% less sodium, 41% less sodium, 40% less sodium, 39% less sodium, 38% less sodium, 37% less sodium, 36% less sodium, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, or 7% less sodium than Conventional PPI.

In some embodiments, the reduced sodium PPI produced by the above process has unique functionality. Such functionality may be, but is not limited to, foaming ability, emulsify ability, gelling ability, and ability to stay soluble at acidic pHs.

In some embodiments, the reduced sodium PPI contains, but is not limited to, globulin, legumin, vicilin, convicilin, albumin, PA-1 albumin, PA-II albumin, lectins, prolamin, glutelin.

Use of the Pea Protein Isolates (PPI)

In some aspects, the present disclosure further provides use of the reduced sodium PPI of the present disclosure in the production of a foam.

In other aspects, the present invention provides use of the reduced sodium PPI of the present disclosure in the production of a gel.

In still other aspects, the present invention provides use of the reduced sodium PPI of the present disclosure in the production of an emulsion. In some embodiments, the emulsion is made from a mixture of equal parts oil and water.

In some aspects, the present disclosure provides a foam comprising the reduced sodium PPI of the present disclosure.

In other aspects, the present disclosure provides a gel comprising the reduced sodium PPI.

In still other aspects, the present disclosure provides an emulsion comprising the reduced sodium PPI of the present disclosure.

In some aspects, the present disclosure provides use of the reduced sodium PPI of the present disclosure in a food or beverage application. In some embodiments, the food or beverage application is selected from milk shake, protein bars, meat analogues, confectionary, condiments, mayonnaise, salad dressing, nutritional supplements and diary alternatives. In certain embodiments, the dairy alternative is selected from creamers, ice cream, yogurt, buttermilk and cheese. The reduced sodium aspect of the PPI makes it of particular interest to individuals with kidney disease, individuals on kidney dialysis, individuals with high blood pressure, and individuals with other conditions where reduced sodium intake is desired.

In yet other aspects, the present disclosure provides a food or beverage comprising the reduced sodium PPI of the present disclosure.

Exemplary Non-Limiting Aspects of the Disclosure

Aspects, including embodiments, of the present subject matter described above may be beneficial alone or in combination, with one or more other aspects or embodiments. Without limiting the foregoing description, certain non-limiting aspects of the disclosure numbered 1-67 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below:

1. A process for making reduced sodium pea protein isolate comprising:
   a. extracting protein from a pea plant source in an aqueous solution to produce a protein solution;
   b. separating the protein solution from the remaining pea plant solids;
   c. precipitating protein from the protein solution at acidic pH to produce a pea protein isolate (PPI); and
   d. neutralizing the PPI by adding NaOH and $Mg(OH)_2$;

Thereby providing a PPI with reduced sodium.

2. The process of aspect 1, wherein neutralizing step e. comprises raising the pH using NaOH, then raising the pH to neutral using $Mg(OH)_2$.

3. The process of aspect 1 or aspect 2 wherein said extracting is performed at a pH of about 7.5 to 10.

4. The process of aspect 1 or aspect 2 wherein said extracting is performed at a pH of 9.5.

5. The process of aspect 1 or aspect 2 wherein said extracting is performed at a temperature of 30 to 80° C.

6. The process of aspect 1 or aspect 2 wherein said extracting is performed at 55° C.

7. The process of aspect 1 or aspect 2 wherein said extracting is performed for 10 to 60 minutes.

8. The process of aspect 1 or aspect 2 wherein said extraction is performed in a solution comprising 5% to 25% pea plant solids.

9. The process of aspect 1 or aspect 2 wherein said extraction is performed in a solution comprising 10% pea plant solids.

10. The process of aspect 1 or aspect 2 wherein said separating is performed by centrifugation.

11. The process of aspect 10 wherein centrifugation is performed at 2000 g to 10000 g.

12. The process of aspect 10 wherein centrifugation is performed at 5000 g.

13. The process of aspect 10 wherein the centrifugation is performed for 2 to 25 minutes.

14. The process of aspect 10 wherein the centrifugation is performed for 10 minutes.

15. A process for making reduced sodium pea protein isolate comprising:
   a. precipitating protein from a pea protein solution at acidic pH to produce a pea protein isolate (PPI);
   b. neutralizing the PPI by adding NaOH and $Mg(OH)_2$;

Thereby providing a PPI with reduced sodium.

16. The process of aspect 15, wherein neutralizing comprises raising the pH using NaOH, then raising the pH to about neutral using $Mg(OH)_2$.

17. The process of any one of aspects 1-2 and 15-16 wherein said precipitating is performed at pH 3 to pH 6.5.

18. The process of any one of aspects 1-2 and 15-16 wherein said precipitating is performed at pH 4.5.

19. The process of any one of aspects 1-2 and 15-16 wherein said precipitating is performed for 10 to 60 minutes.

20. The process of any one of aspects 1-2 and 15-16 wherein said precipitating is performed for 30 minutes.

21. The process of any one of aspects 1-2 and 15-16 wherein said precipitation is performed a temperature of 30 to 80° C.

22. The process of any one of aspects 1-2 and 15-16 wherein said precipitation is performed a temperature of 55° C.

23. The process of any one of aspects 1-2 and 15-16 further comprising washing the PPI.

24. The process of aspect 23 wherein said washing is performed at acidic pH.

25. The process of aspect 24 wherein said washing is performed at the precipitation pH.

26. The process of any one of aspects 24-25 wherein said washing is performed one to four times.

27. The process of any one of aspects 23-25 wherein said washing is performed 2 times.

28. The process of any one of aspects 1-2 and 15-16 comprising diluting the PPI by adding 1× to 4× volume of water to said PPI to make a slurry.

29. The process of aspect 28, wherein 2× water is added to the PPI.

30. The process of any one of aspects 1-2 and 15-16 wherein said neutralizing comprises adding NaOH to raise the pH to pH 6.0 to pH 6.9, then adding $Mg(OH)_2$ to raise the pH to 7.0 to 7.5.

31. The process of any one of aspects 1-2 and 15-16 wherein said neutralizing comprises adding NaOH to raise the pH to 6.0, then adding $Mg(OH)_2$ to raise the pH to 7.0.

32. The process of any one of aspects 1-2 and 15-16 wherein said neutralizing comprises adding NaOH to raise the pH to 6.2, then adding $Mg(OH)_2$ to raise the pH to 7.0.

33. The process of any one of aspects 1-2 and 15-16 wherein said neutralizing comprises adding NaOH to raise the pH to 6.5, then adding $Mg(OH)_2$ to raise the pH to 7.0.

34. The process of any one of aspects 1-2 and 15-16 wherein said neutralizing comprises adding NaOH to raise the pH to 6.7, then adding $Mg(OH)_2$ to raise the pH to 7.0.

35. The process of any one of aspects 1-2 and 15-16 wherein said neutralizing comprises adding NaOH to raise the pH to 6.9, then adding $Mg(OH)_2$ to raise the pH to 7.0.

36. The process of any one of aspects 1-2 and 15-16 wherein said precipitating is performed at pH 3.5-5.5 and said neutralizing comprises adding NaOH to raise the pH to 6.0-6.9, then adding $Mg(OH)_2$ to raise the pH to 7.0.

37. The process of any one of aspects 1-2 and 15-16 wherein said precipitation is performed at pH 4.5 and said neutralizing comprises adding NaOH to raise the pH to 6.0, then adding $Mg(OH)_2$ to raise the pH to 7.0.

38. The process of any one of aspects 1-2 and 15-16 wherein said precipitation is performed at pH 4.5 and said neutralizing comprises adding NaOH to raise the pH to 6.2, then adding $Mg(OH)_2$ to raise the pH to 7.0.

39. The process of any one of aspects 1-2 and 15-16 wherein said precipitation is performed at pH 4.5 and said neutralizing comprises adding NaOH to raise the pH to 6.5, then adding $Mg(OH)_2$ to raise the pH to 7.0.

40. The process of any one of aspects 1-2 and 15-16 wherein said precipitation is performed at pH 4.5 and said neutralizing comprises adding NaOH to raise the pH to 6.7, then adding $Mg(OH)_2$ to raise the pH to 7.0.

41. The process of any one of aspects 1-2 and 15-16 wherein said precipitation is performed at pH 4.5 and said neutralizing comprises adding NaOH to raise the pH to 6.9, then adding $Mg(OH)_2$ to raise the pH to 7.0.

42. The process of any one of aspects 1-2 and 15-16 wherein said precipitation is performed at pH 4.5 and said neutralizing comprises adding NaOH to a concentration of 0.56%, then adding $Mg(OH)_2$ to a concentration of 0.29%.

43. The process of any one of aspects 1-2 and 15-16 wherein said precipitation is performed at pH 4.5 and said neutralizing g comprises adding NaOH to a concentration of 0.67%, then adding $Mg(OH)_2$ to a concentration of 0.20%.

44. The process of any one of aspects 1-2 and 15-16 wherein said precipitation is performed at pH 4.5 and said neutralizing comprises adding NaOH to a concentration of 0.83%, then adding $Mg(OH)_2$ to a concentration of 0.13%.

45. The process of any one of aspects 1-2 and 15-16 wherein said precipitation is performed at pH 4.5 and said neutralizing comprises adding NaOH to a concentration of 0.89%, then adding $Mg(OH)_2$ to a concentration of 0.07%.

46. The process of any one of aspects 1-45, further comprising homogenizing the protein isolate.

47. The process of aspect 46 wherein said homogenization is performed using a high pressure homogenizer.

48. The process of any one of aspects 1-47, further comprising sterilizing or pasteurizing the protein isolate.

49. The process of aspect 48, wherein said sterilizing is performed by direct stream injection.

50. The process of aspect 48 or 49 wherein said sterilizing is performed at 75-140° C.

51. The process of any one of aspects 48-50, wherein said sterilizing is performed for 2 seconds to 10 minutes.

52. the process of any one of aspects 1-51, further comprising drying the PPI.

53. The process of aspect 52 wherein said drying is performed using a freeze/spray drier 54. A pea protein isolate comprising about 0.4-0.9% Na and about 0.05-0.35% Mg.

55. A pea protein isolate comprising about 0.56% Na and about 0.29% Mg.

56. A pea protein isolate comprising about 0.67% Na and about 0.20% Mg.

57. A pea protein isolate comprising about 0.83% Na and about 0.13% Mg.

58. A pea protein isolate comprising about 0.89% Na and about 0.07% Mg.

59. A pea protein isolate made by the process of any one of aspects 1-2 and 15-16.

60. A pea protein isolate made by the process of any one of aspects 1-53.

61. A pea protein isolate having <0.9% (db) sodium at pH 7.

62. A pea protein isolate having <0.85% (db) sodium at pH 7.

63. A pea protein isolate having <0.8% (db) sodium at pH 7.

64. A pea protein isolate having <0.75% (db) sodium at pH 7.

65. A pea protein isolate having <0.7% (db) sodium at pH 7.

66. A pea protein isolate having <0.65% (db) sodium at pH 7.

67. A pea protein isolate having <0.6% (db) sodium at pH 7.

Examples

The following examples are put forth so as to provide those of ordinary skill in the art with a complete disclosure and description of how to make and use the present invention and are not intended to limit the scope of what the inventors regard as their invention, nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, temperature is in degrees Centigrade, and times are in minutes.

All publications and patent applications cited in this specification are herein incorporated by reference as if each individual publication or patent application were specifically and individually indicated to be incorporated by reference.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. All such modifications are intended to be included within the scope of the appended claims.

EXAMPLE

Process

In this Example, the reduced sodium PPI was prepared by precipitating protein from a protein solution in an acidic solution then adding NaOH and $Mg(OH)_2$, as described in table 1.

TABLE 1

| No. | Step | Process details |
|---|---|---|
| 1 | Extracting Protein | pH of extraction: 9.5<br>Time of extraction: 30 min<br>Temperature of extraction: 55° C.<br>Concentration: 10% pea flour solids |
| 2 | Separating Solids | Centrifugation at 5000 g for 10 minutes at room temperature |
| 3 | Precipitating protein | Precipitation of protein at pHs 4.5 for 30 min<br>Precipitation temperature: 55° C. |
| 4 | Washing Protein isolate | Washing the protein with 2x water at precipitation pH |
| 5 | Diluting and Neutralizing | Diluting PPI with 2x water to make a slurry and adjust pH to pH 7<br>Adding NaOH to raise the pH from 4.5 to pH 6.0, 6.2, 6.5, 6.7 or 6.9 (Run 1, 2, 3, 4, 5, respectively)<br>Adding $Mg(OH)_2$ to raise the pH to pH 7.0 |
| 6 | Homogenizing and Sterilizing | Homogenizing the protein slurry using a high-pressure homogenizer<br>Sterilizing the protein slurry in a direct steam injection |
| 7 | Drying | Drying the protein slurry by a freeze/spray drier |

Result

The resulting reduced sodium content in the PPI produced by the processes described in Table 1

TABLE 2

| Run | Sample description | Na (%) | Mg (%) |
|---|---|---|---|
| Ø1 | PPI without Neutralizing (pH 4.5) | 0.16 | 0.007 |
| 1 | Add NaOH to pH 6.0, $Mg(OH)_2$ to pH 7 | 0.56 | 0.29 |
| 2 | Add NaOH to pH 6.2, $Mg(OH)_2$ to pH 7 | 0.67 | 0.20 |
| 3 | Add NaOH to pH 6.5, $Mg(OH)_2$ to pH 7 | 0.77 | 0.18 |
| 4 | Add NaOH to pH 6.7, $Mg(OH)_2$ to pH 7 | 0.83 | 0.13 |
| 5 | Add NaOH to pH 6.9, $Mg(OH)_2$ to pH 7 | 0.89 | 0.07 |
| Ø2 | Add NaOH to pH 7 | 0.95 | 0.008 |

The use of Mg(OH)2 in addition to NaOH to neutralize the PPI resulted in a substantial reduction in the sodium content of the final PPI.

What is claimed is:

1. A process for making reduced sodium pea protein isolate consisting of:

a. extracting pea protein from a pea plant source in an aqueous solution to produce a pea protein solution;

b. separating the protein solution from the remaining pea plant solids, c. precipitating protein from a pea protein solution at a pH of 3.5 to 5.5 to produce an acidic pea protein isolate (PPI);

d. washing the PPI, e. neutralizing the acidic PPI by:

(i) adding NaOH to raise the pH to 6.0-6.2; and (ii) adding $Mg(OH)_2$ to raise the pH to 7.0;

f. homogenizing the PPI, g. sterilizing or pasteurizing the PPI, and . drying the PPI, thereby providing a PPI with reduced sodium.

2. The process of claim 1 wherein said precipitating is performed at a pH of 4.5.

3. The process of claim 1 wherein said precipitating is performed for 10 to 60 minutes.

4. The process of claim 1 wherein said precipitating is performed a temperature of 30 to 80° C.

5. The process of claim 4 wherein said precipitating is performed a temperature of 55° C.

6. The process of claim 1 wherein said washing is performed at an acidic pH.

7. The process of claim 6 wherein said washing is performed at the precipitating pH.

8. The process of claim 1, wherein the neutralizing comprises diluting the PPI by adding a volume of water 1X to 4X of the volume of said PPI to make a slurry.

9. The process of claim 1 wherein said precipitating is performed at a pH of 4.5 and said neutralizing comprises adding NaOH to raise the pH to 6.0, then adding $Mg(OH)_2$ to raise the pH to 7.0.

10. The process of claim 1 wherein said precipitating is performed at a pH of 4.5 and said neutralizing comprises adding NaOH to raise the pH to 6.2, then adding $Mg(OH)_2$ to raise the pH to 7.0.

11. The process of claim 1 wherein said precipitating is performed at a pH of 4.5 and said neutralizing comprises adding NaOH to a concentration of 0.56% weight of Na to weight of PPI (wt./wt of total PPI solids), then adding $Mg(OH)_2$ to a concentration of 0.29% (wt./wt of total PPI solids).

12. The process of claim 1 wherein said precipitating is performed at a pH of 4.5 and said neutralizing comprises adding NaOH to a concentration of 0.67% (wt./wt. of total PPI solids), then adding $Mg(OH)_2$ to a concentration of 0.20% (wt./wt of total PPI solids).

13. A pea protein isolate made by the process of claim 1.

14. The process of claim 1 wherein said extracting is performed at a pH of about 7.5 to 10.

15. The process of claim 1 wherein said extracting is performed at a temperature of 30 to 80° C.

16. The process of claim 1 wherein said separating is performed by centrifugation.

* * * * *